United States Patent
Lee et al.

(10) Patent No.: US 11,859,878 B2
(45) Date of Patent: Jan. 2, 2024

(54) ELECTROCALORIC HEAT TRANSFER SYSTEM

(71) Applicant: Carrier Corporation, Palm Beach Gardens, FL (US)

(72) Inventors: Yongduk Lee, Vernon, CT (US); Vladimir Blasko, Avon, CT (US); Joseph V. Mantese, Ellington, CT (US); Subramanyaravi Annapragada, South Windsor, CT (US); Wei Xie, Malden, MA (US); Luis Arnedo, South Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 319 days.

(21) Appl. No.: 17/058,915

(22) PCT Filed: Oct. 23, 2019

(86) PCT No.: PCT/US2019/057619
§ 371 (c)(1),
(2) Date: Nov. 25, 2020

(87) PCT Pub. No.: WO2020/086694
PCT Pub. Date: Apr. 30, 2020

(65) Prior Publication Data
US 2021/0239368 A1    Aug. 5, 2021

Related U.S. Application Data

(60) Provisional application No. 62/749,401, filed on Oct. 23, 2018.

(51) Int. Cl.
*F25B 21/00* (2006.01)
*H01H 33/04* (2006.01)
(Continued)

(52) U.S. Cl.
CPC .............. *F25B 21/00* (2013.01); *F25B 49/00* (2013.01); *H01H 33/045* (2013.01); *H01H 33/26* (2013.01); *F25B 2321/001* (2013.01)

(58) Field of Classification Search
CPC .... F25B 21/00; F25B 49/00; F25B 2321/001; H01H 33/045; H01H 33/26; Y02B 30/00
See application file for complete search history.

(56) References Cited

U.S. PATENT DOCUMENTS

| 3,641,358 A | 2/1972 | Lian et al. |
| 4,161,009 A | 7/1979 | Harvey et al. |

(Continued)

FOREIGN PATENT DOCUMENTS

| CN | 206947949 U | 1/2018 |
| CN | 906947949 U | 1/2018 |

(Continued)

OTHER PUBLICATIONS

International Search Report for International Application No. PCT/US2019057619; Application Filing Date: Oct. 23, 2019; dated Jan. 21, 2020; 5 pages.

(Continued)

*Primary Examiner* — Ana M Vazquez
(74) *Attorney, Agent, or Firm* — CANTOR COLBURN LLP (57) ABSTRACT

A heat transfer system is disclosed that includes an electrocaloric element including an electrocaloric material and electrodes arranged to impart an electric field to the electrocaloric material. A first thermal flow path is disposed between the electrocaloric material and a heat sink. A second thermal flow path is disposed between the electrocaloric material and a heat source. An electric power source is in operative electrical communication with the electrodes. The system also includes an arc suppression circuit in series with (Continued)

the electrocaloric element. The arc suppression circuit includes an interruptible electrical connection configured to interrupt the electrical connection in response to detection of an arc between the electrodes, and a series shunt connection in parallel with the interruptible electrical connection, with the series shunt connection including a series shunt load.

17 Claims, 3 Drawing Sheets

(51) Int. Cl.
*H01H 33/26* (2006.01)
*F25B 49/00* (2006.01)

(56) References Cited

U.S. PATENT DOCUMENTS

| | | | |
|---|---|---|---|
| 6,275,044 B1 | 8/2001 | Scott | |
| 6,600,668 B1 | 7/2003 | Patel et al. | |
| 7,145,758 B2 | 12/2006 | King et al. | |
| 7,499,251 B2 | 3/2009 | Byron | |
| 7,729,094 B2 | 6/2010 | Gossner | |
| 7,821,749 B2 | 10/2010 | Asokan et al. | |
| 8,619,395 B2 | 12/2013 | Henke | |
| 8,781,637 B2 | 7/2014 | Eaves | |
| 8,848,332 B2 | 9/2014 | Schmidt | |
| 9,423,442 B2 | 8/2016 | Henke | |
| 9,897,640 B2 | 2/2018 | Chen et al. | |
| 2006/0056118 A1 | 3/2006 | Huczko et al. | |
| 2008/0100976 A1 | 5/2008 | Huczko et al. | |
| 2008/0216745 A1* | 9/2008 | Wiedemuth | H01J 37/32045 118/723 R |
| 2010/0175392 A1* | 7/2010 | Malloy | F25B 21/00 62/62 |
| 2014/0168843 A1* | 6/2014 | Privitera | G01R 31/50 702/58 |
| 2014/0334050 A1 | 11/2014 | Henke | |
| 2017/0146270 A1 | 5/2017 | Colognesi | |

FOREIGN PATENT DOCUMENTS

| | | |
|---|---|---|
| EP | 2065770 A1 | 6/2009 |
| EP | 2851634 A1 | 3/2015 |
| WO | 2006056809 A1 | 6/2006 |
| WO | 2008088755 A2 | 7/2008 |
| WO | 2017111921 A1 | 6/2017 |
| WO | 2020086694 A1 | 4/2020 |

OTHER PUBLICATIONS

Written Opinion for International Application No. PCT/US2019057619; Application Filing Date: Oct. 23, 2019; dated Jan. 21, 2020; 9 pages.

\* cited by examiner

ELECTROCALORIC HEAT TRANSFER SYSTEM

CROSS REFERENCE TO RELATED APPLICATIONS

This application is a National Stage application of PCT/US2019/057619, filed Oct. 23, 2019, which claims the benefit of U.S. Provisional Application No. 62/749,401, filed Oct. 23, 2018, both of which are incorporated by reference in their entirety herein.

BACKGROUND

A wide variety of technologies exist for cooling applications, including but not limited to evaporative cooling, convective cooling, or solid state cooling such as electrothermic cooling. One of the most prevalent technologies in use for residential and commercial refrigeration and air conditioning is the vapor compression refrigerant heat transfer loop. These loops typically circulate a refrigerant having appropriate thermodynamic properties through a loop that includes a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, many of the refrigerants can present environmental hazards such as ozone depleting potential (ODP) or global warming potential (GWP), or can be toxic or flammable. Additionally, vapor compression refrigerant loops can be impractical or disadvantageous in environments lacking a ready source of power sufficient to drive the mechanical compressor in the refrigerant loop. For example, in an electric vehicle, the power demand of an air conditioning compressor can result in a significantly shortened vehicle battery life or driving range. Similarly, the weight and power requirements of the compressor can be problematic in various portable cooling applications.

Accordingly, there has been interest in developing cooling technologies as alternatives to vapor compression refrigerant loops. Various technologies have been proposed such as field-active heat or electric current-responsive heat transfer systems relying on materials such as electrocaloric materials, magnetocaloric materials, or thermoelectric materials. However, many proposals have been configured as bench-scale demonstrations with limited capabilities.

BRIEF DESCRIPTION

A heat transfer system is disclosed that includes an electrocaloric element including an electrocaloric material and electrodes arranged to impart an electric field to the electrocaloric material. A first thermal flow path is disposed between the electrocaloric material and a heat sink. A second thermal flow path is disposed between the electrocaloric material and a heat source. An electric power source is in operative electrical communication with the electrodes. The system also includes an arc suppression circuit in series with the electrocaloric element. The arc suppression circuit includes an interruptible electrical connection configured to interrupt the electrical connection in response to detection of an arc between the electrodes, and a series shunt connection in parallel with the interruptible electrical connection, said series shunt connection including a series shunt load.

In some embodiments, the interruptible electrical connection can include a first interruptible mono-directional connection configured to conduct current in a first direction with respect to the electrocaloric element, and a second interruptible mono-directional connection configured to conduct current in a second direction opposite to the first direction with respect to the electrocaloric element.

In some embodiments, the first and second interruptible electrical connections can be configured to open and close out of sync to provide an alternating direction of current flow in response to normal operation to alternately activate and deactivate the electrocaloric material in response to normal operation, and to both open simultaneously in response to detection of an arc between the electrodes.

In any one or combination of the foregoing embodiments, the arc suppression circuit can be disposed between the electrocaloric element and a connection to a positive voltage of the power source. Alternatively, in any one or combination of the foregoing embodiments, the arc suppression circuit is disposed between the electrocaloric element and a connection to a negative voltage of the power source.

In any one or combination of the foregoing embodiments, the arc suppression circuit can be disposed between the electrocaloric element and a connection to connection to a neutral voltage.

In any one or combination of the foregoing embodiments, the system can further comprise a parallel shunt connection including a parallel shunt load, in operative electrical communication with the power source in parallel with the electrocaloric element. In some embodiments, the parallel shunt load has a lower resistance than the series shunt load.

Also disclosed is a heat transfer system is disclosed that includes an electrocaloric element including an electrocaloric material and electrodes arranged to impart an electric field to the electrocaloric material. A first thermal flow path is disposed between the electrocaloric material and a heat sink. A second thermal flow path is disposed between the electrocaloric material and a heat source. An electric power source is in operative electrical communication with the electrodes. The system also includes a parallel shunt connection including a parallel shunt load, and the parallel shunt connection in operative electrical communication with the power source is in parallel with the electrocaloric element.

In any one or combination of the foregoing embodiments with a parallel shunt connection, the parallel shunt connection can be configured to preclude current flow through the parallel shunt connection in response to normal operation and to allow current flow through the parallel shunt connection in response to detection of an arc between the electrodes.

In any one or combination of the foregoing embodiments with a parallel shunt connection, the second shunt connection can include a power crowbar switch in series with the second shunt load, configured to preclude current flow through the power crowbar switch in response to normal operation and to allow current flow through the power switch in response to detection of an arc between the electrodes.

In any one or combination of the foregoing embodiments with a parallel power crowbar switch, the power crowbar switch can include a diode arranged to protect current flow in a direction from a negative voltage of the power source to a positive voltage of the power source or to a neutral voltage, and a bypass connection in parallel with the diode configured to activate in response to detection of an arc between the electrodes.

In any one or combination of the foregoing embodiments, the heat transfer system can further include a controller configured to selectively apply voltage to activate the electrodes in coordination with heat transfer along the first and second thermal flow paths to transfer heat from the heat source to the heat sink.

In any one or combination of the foregoing embodiments, the heat transfer system can further include a controller configured to detect an arc between the electrodes and to direct electrical current from the arcing electrodes through the series shunt load or to the parallel shunt load or to both the series shunt load and the parallel shunt load.

Also disclosed is a method of transferring heat. According to the method, applying voltage from a power source is selectively applied to activate electrodes and apply an electric field to an electrocaloric material. In coordination with application of voltage to the electrodes, heat is transferred from a heat source to the electrocaloric material and from the electrocaloric material to a heat sink. Also according to the method, monitoring is performed for occurrence of arcing between the electrodes. In response to detection of arcing between the electrodes, electrical current from the arcing electrodes is directed to a shunt load in series or in parallel with the arcing electrodes with respect to the power source.

In some embodiments according to the foregoing method, electrical current is directed from the arcing electrodes to a shunt load in series with the arcing electrodes in response to detection of arcing.

According to some embodiments, electrical current is directed from the arcing electrodes to a shunt load in parallel with the arcing electrodes in response to detection of arcing.

According to some embodiments, electrical current is directed from the arcing electrodes to a shunt load in series with the arcing electrodes and to a shunt load in parallel with the arcing electrodes in response to detection of arcing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
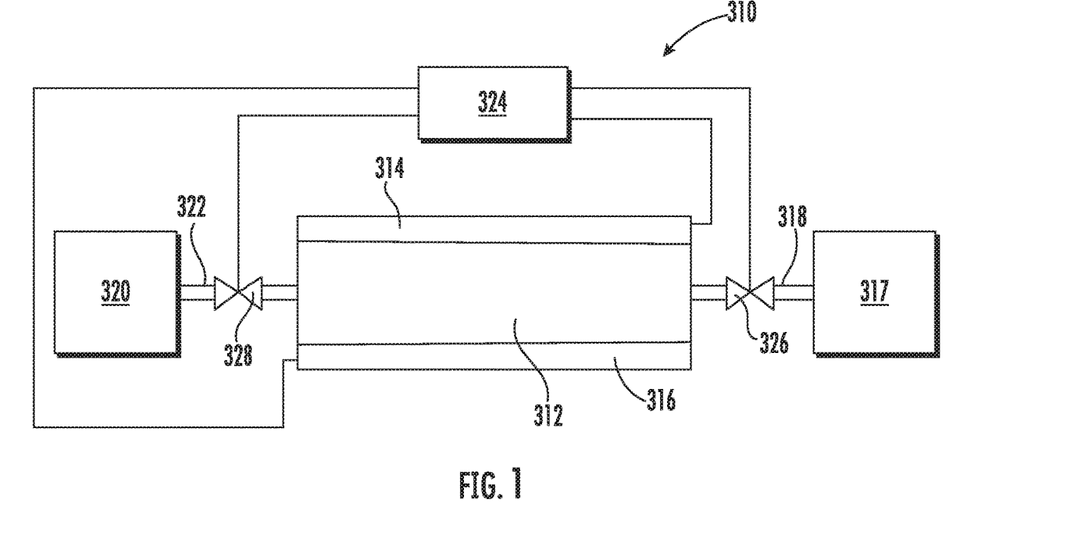
FIG. 1 is a schematic depiction of an example embodiment of an electrocaloric heat transfer system.

An example embodiment of a heat transfer system and its operation are described with respect to FIG. 1. As shown in FIG. 1, a heat transfer system 310 comprises an electrocaloric material 312 with first and second electrical buses 314 and 316 in electrical communication with electrodes on the electrocaloric material. The electrocaloric material 312 is in thermal communication with a heat sink 317 through a first thermal flow path 318, and in thermal communication with a heat source 320 through a second thermal flow path 322. The thermal flow paths can be described with respect thermal transfer through flow of working fluid through control devices 326 and 328 (e.g., flow dampers or valves) between the stack and the heat sink and heat source. A controller 324 is configured to control electrical current to through a power source (not shown) to selectively activate the buses 314, 316. In some embodiments, the electrocaloric material can be activated by energizing one bus bar/electrode while maintaining the other bus bar/electrode at a neutral voltage. The controller 324 is also configured to open and close control devices 326 and 328 to selectively direct the working fluid along the first and second flow paths 318 and 322.

In operation, the system 310 can be operated by the controller 324 applying an electric field as a voltage differential across the electrocaloric material 312 in the stack to cause a decrease in entropy and a release of heat energy by the electrocaloric material 312. The controller 324 opens the control device 326 to transfer at least a portion of the released heat energy along flow path 318 to heat sink 317. This transfer of heat can occur after the temperature of the electrocaloric material 312 has risen to a threshold temperature. In some embodiments, heat transfer to the heat sink 317 is begun as soon as the temperature of the electrocaloric material 312 increases to be about equal to the temperature of the heat sink 317. After application of the electric field for a time to induce a desired release and transfer of heat energy from the electrocaloric material 312 to the heat sink 317, the electric field can be removed. Removal of the electric field causes an increase in entropy and a decrease in heat energy of the electrocaloric material 312. This decrease in heat energy manifests as a reduction in temperature of the electrocaloric material 312 to a temperature below that of the heat source 320. The controller 324 closes control device 326 to terminate flow along flow path 318, and opens control device 328 to transfer heat energy from the heat source 320 to the colder electrocaloric material 312 in order to regenerate the electrocaloric material 312 for another cycle.

In some embodiments, for example where a heat transfer system is utilized to maintain a temperature in a conditioned space or thermal target, the electric field can be applied to the electrocaloric material 312 to increase temperature until the temperature reaches a first threshold. After the first temperature threshold, the controller 324 opens control device 326 to transfer heat from the stack to the heat sink 317 until a second temperature threshold is reached. The electric field can continue to be applied during all or a portion of the time period between the first and second temperature thresholds, and is then removed to reduce the temperature until a third temperature threshold is reached. The controller 324 then closes control device 326 to terminate heat flow transfer along heat flow path 318, and opens control device 328 to transfer heat from the heat source 320 to the stack. The above steps can be optionally repeated until a target temperature of the conditioned space or thermal target (which can be either the heat source or the heat sink) is reached.

In some embodiments, the electrocaloric material 312 referenced above can comprise an electrocaloric film connected to a frame. The frame can include various configurations, including but not limited to full peripheral frames (e.g., 'picture' frames) and components thereof, partial peripheral frames and components thereof, or internal frames and components thereof. In some embodiments, the frame can be part of a repeating modular structure that can be assembled along with a set of electrocaloric films in a stack-like fashion. In some embodiments, the frame can be a unitary structure equipped with one or more attachment points to receive one or more of electrocaloric films.

Figure 2:
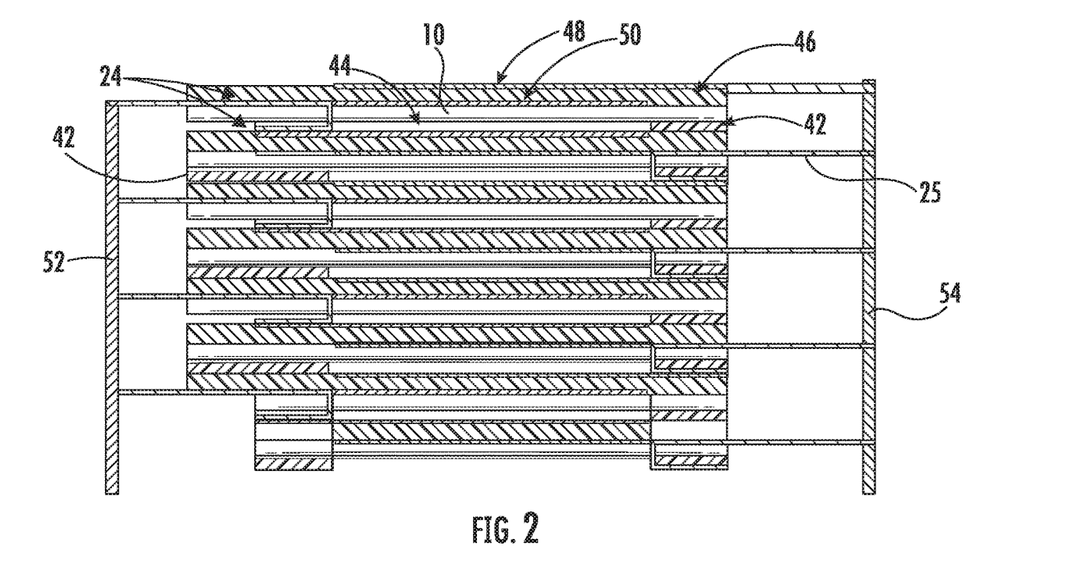
FIG. 2 schematically shows an example embodiment of a plurality of electrocaloric film segments in a stacked configuration.

In some embodiments, a heat transfer device can include a plurality of electrocaloric film segments in a stack configuration arranged to provide flow paths for a working fluid between adjacent electrocaloric film segments. A stack of repeating modular framed electrocaloric films 46 is schematically shown in a cross-sectional view in FIG. 2. The order of assembly can be varied and adapted to achieve target specifications, and the order shown in FIG. 2 is a typical example including peripheral frames 10, spacers 42, electrocaloric elements having electrocaloric films 46 with first electrodes 48 and second electrodes 50, and first and second electrically conductive elements 24, 25 electrically connected to the first and second electrodes 48, 50 and to first and second electrical buses 52, 54, respectively. As shown in FIG. 2, the electrocaloric films are disposed in the stack with a configuration such that the relative (top/bottom) orientation of the first and second electrodes 48, 50 is alternated with adjacent films so that each fluid flow path 44 has electrodes of matching voltage on each side of the fluid flow path 44, which can inhibit arcing across the flow path gap.

It should be noted that although FIG. 2 discloses individual segments of electrocaloric film attached to a peripheral frame in a picture-frame configuration, other configurations of electrocaloric articles can be utilized such as electrocaloric articles formed from a continuous sheet of electrocaloric film, or different frame configurations such as internal frame components (e.g., stack spacers) or peripheral frames covering less than the full perimeter of the electrocaloric film, or combinations of the above features with each other or other features. Continuous sheets of electrocaloric film can be dispensed directly from a roll and manipulated by bending back and forth into a stack-like configuration, or can be cut into a pre-cut length and bent back and forth into the stack-like configuration. Additional disclosure regarding continuous sheet electrocaloric articles can be found in PCT published application no. WO2017/111916 A1, and in U.S. patent application Ser. No. 62/722,736, the disclosures of both of which are incorporated herein by reference in their entirety. Also, the stack of FIG. 2 or other electrocaloric heat transfer devices can be arranged in a cascade with other electrocaloric heat transfer devices such as disclosed in US Patent Pub. No. 2017/0356679 A1, the disclosure of which is incorporated herein by reference in its entirety.

As mentioned above, the electrocaloric module includes an electrocaloric material, such as an electrocaloric film that can be formed into a stack-like structure. Examples of electrocaloric materials for the electrocaloric film can include but are not limited to inorganic (e.g., ceramics) or organic materials such as electrocaloric polymers, and polymer/ceramic composites. Composite materials such as organic polymers with inorganic fillers and/or fillers of a different organic polymer. Examples of inorganic electrocaloric materials include but are not limited to $PbTiO_3$ ("PT"), $Pb(Mg_{1/3}Nb_{2/3})O_3$ ("PMN"), PMN-PT, $LiTaO_3$, barium strontium titanate (BST) or PZT (lead, zirconium, titanium, oxygen). Examples of electrocaloric polymers include, but are not limited to ferroelectric polymers, liquid crystal polymers, and liquid crystal elastomers. Ferroelectric polymers are crystalline polymers, or polymers with a high degree of crystallinity, where the crystalline alignment of polymer chains into lamellae and/or spherulite structures can be modified by application of an electric field. Such characteristics can be provided by polar structures integrated into the polymer backbone or appended to the polymer backbone with a fixed orientation to the backbone. Examples of ferroelectric polymers include polyvinylidene fluoride (PVDF), polytriethylene fluoride, odd-numbered nylon, copolymers containing repeat units derived from vinylidene fluoride, and copolymers containing repeat units derived from triethylene fluoride. Polyvinylidene fluoride and copolymers containing repeat units derived from vinylidene fluoride have been widely studied for their ferroelectric and electrocaloric properties. Examples of vinylidene fluoride-containing copolymers include copolymers with methyl methacrylate, and copolymers with one or more halogenated co-monomers including but not limited to trifluoroethylene, tetrafluoroethylene, chlorotrifluoroethylene, trichloroethylene, vinylidene chloride, vinyl chloride, and other halogenated unsaturated monomers. In some embodiments, the electrocaloric film can include a polymer composition according to WO 2018/004518 A1 or WO 2018/004520 A1, the disclosures of which are incorporated herein by reference in their entirety.

Liquid crystal polymers, or polymer liquid crystals comprise polymer molecules that include mesogenic groups. Mesogenic molecular structures are well-known, and are often described as rod-like or disk-like molecular structures having electron density orientations that produce a dipole moment in response to an external field such as an external electric field. Liquid crystal polymers typically comprise numerous mesogenic groups connected by non-mesogenic molecular structures. The non-mesogenic connecting structures and their connection, placement and spacing in the polymer molecule along with mesogenic structures are important in providing the fluid deformable response to the external field. Typically, the connecting structures provide stiffness low enough so that molecular realignment is induced by application of the external field, and high enough to provide the characteristics of a polymer when the external field is not applied. In some exemplary embodiments, a liquid crystal polymer can have rod-like mesogenic structures in the polymer backbone separated by non-mesogenic spacer groups having flexibility to allow for re-ordering of the mesogenic groups in response to an external field. Such polymers are also known as main-chain liquid crystal polymers. In some exemplary embodiments, a liquid crystal polymer can have rod-like mesogenic structures attached as side groups attached to the polymer backbone. Such polymers are also known as side-chain liquid crystal polymers. Electrodes on the electrocaloric film can take different forms with various electrically conductive components. The electrodes can be any type of conductive material, including but not limited to metallized layers of a conductive metal such as aluminum or copper, or other conductive materials such as carbon (e.g., carbon nanotubes, graphene, or other conductive carbon). Noble metals can also be used, but are not required. Other conductive materials such as a doped semiconductor, ceramic, or polymer, or conductive polymers can also be used. In some embodiments, the electrodes can be in the form of metalized layers or patterns on each side of the film such as disclosed in published PCT application WO 2017/111921 A1 or U.S. patent application 62/521,080, the disclosures of each of which is incorporated herein by reference in its entirety.

In some embodiments, electrocaloric film thickness can be in a range having a lower limit of 0.1 µm, more specifically 0.5 µm, and even more specifically 1 µm. In some embodiments, the film thickness range can have an upper limit of 1000 µm, more specifically 100 µm, and even more specifically 10 µm. It is understood that these upper and lower range limits can be independently combined to disclose a number of different possible ranges. Within the above general ranges, it has been discovered that thinner films can promote efficiency by reducing parasitic thermal losses, compared to thicker films.

Figure 3:
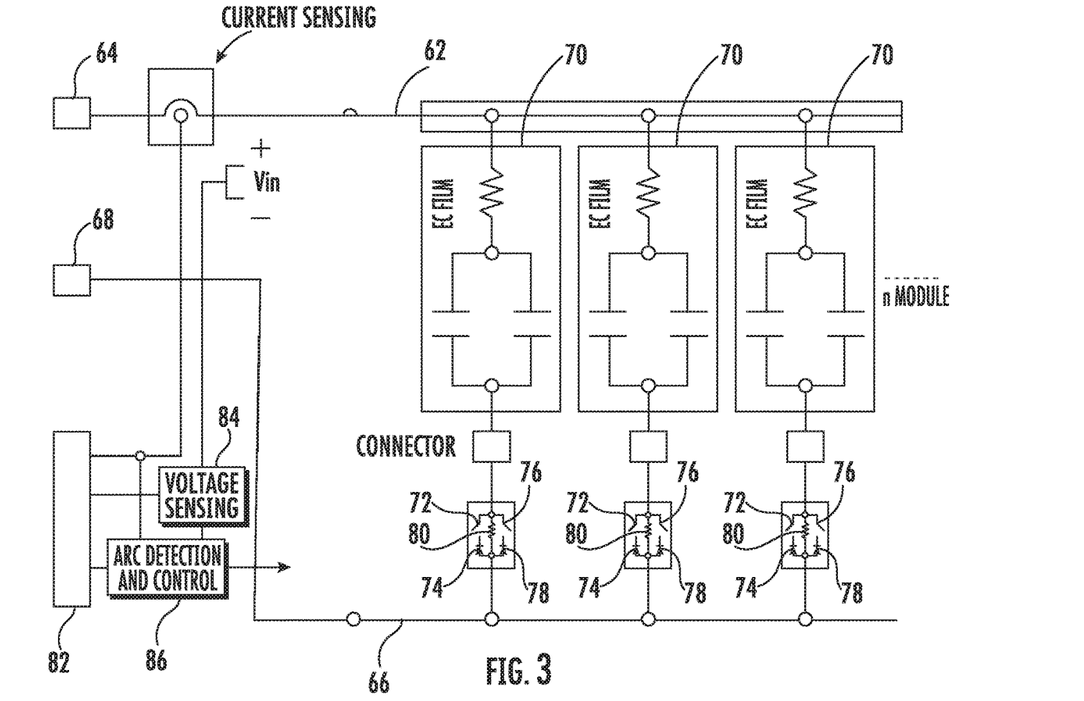
FIG. 3 schematically shows an electrical diagram including an electrocaloric element and a shunt load in series with the electrocaloric element.

As mentioned above, the heat transfer systems disclosed herein include a shunt load to which electrical current can be directed to dissipate electrical charges from electrodes in response to detection of arcing at the electrodes. An example embodiment of a configuration with a shunt load is shown in FIG. 3. As shown in FIG. 3, an electrical bus 62 (e.g., of positive voltage) is electrically connected to a positive voltage connection 64 of a power source, and an electrical bus 66 of negative voltage is electrically connected to a negative voltage connection 68 to the power source. If we consider a series of stacked electrodes, it could involve the electrical bus 66 connected to a neutral voltage connection. Three electrocaloric elements or modules 70 are shown disposed between and electrically connected to the electrical buses 62 and 66, although other numbers of modules (e.g., "n modules") can be connected to the electrical buses 62/66. The electrocaloric elements or modules 70 can be individual electrocaloric film segments, or groups of film segments in a stack, or an entire stack of film segments. A set of switches and diodes 72/74/76/78 is disposed in series with each electrocaloric element or module 70, with switches 72 and diodes 74 arranged in parallel with switches 76 and diodes 78. The switches 72/76 can be any type of switch including a simple power switch; however, in some embodiments the switches 72/76 can be solid state gated devices (e.g., MOSFET or IGBT) made from materials such as silicon, gallium nitride, silicon carbide that receive a control signal to a device gate to connect or disconnect the device source and drain terminals. A resistor 80 is disposed as a shunt load in parallel with the two switch lines to serve as a shunt load in an arcing event. A controller connector 82 includes voltage sensing 84 and current sensing (shown in FIG. 3) that receives voltage differential signals IG. These sensors (not shown) disposed at positions to measurement voltage differentials associated with the electrocaloric modules 70 indicative of arcing, and controls the power flow, the position of switches 72 and 76, and heat flow (e.g., fluid flow) in and out of the electrocaloric modules. During operation, the electrocaloric material in the electrocaloric elements is activated by applying an electric field from energized electrodes. The electrodes are energized during a charging phase by closing switches 76 and keeping switches 72 open, with the diodes 78 allowing for current flow in a direction for charging. The electrodes are de-energized during a discharge phase by closing switches 72 and keeping switches 76 open, with the diodes 74 allowing for current flow in a direction for discharging. In the event of an arc at the electrodes in a module, the power supply received the arcing fault flag from the arc detection controller 86, the power system is turned off that waits the clearing arc fault flag, and the switches 72 and 74 for that module both open, leaving a shunt path for current discharge through the resistor 80.

Figure 4:
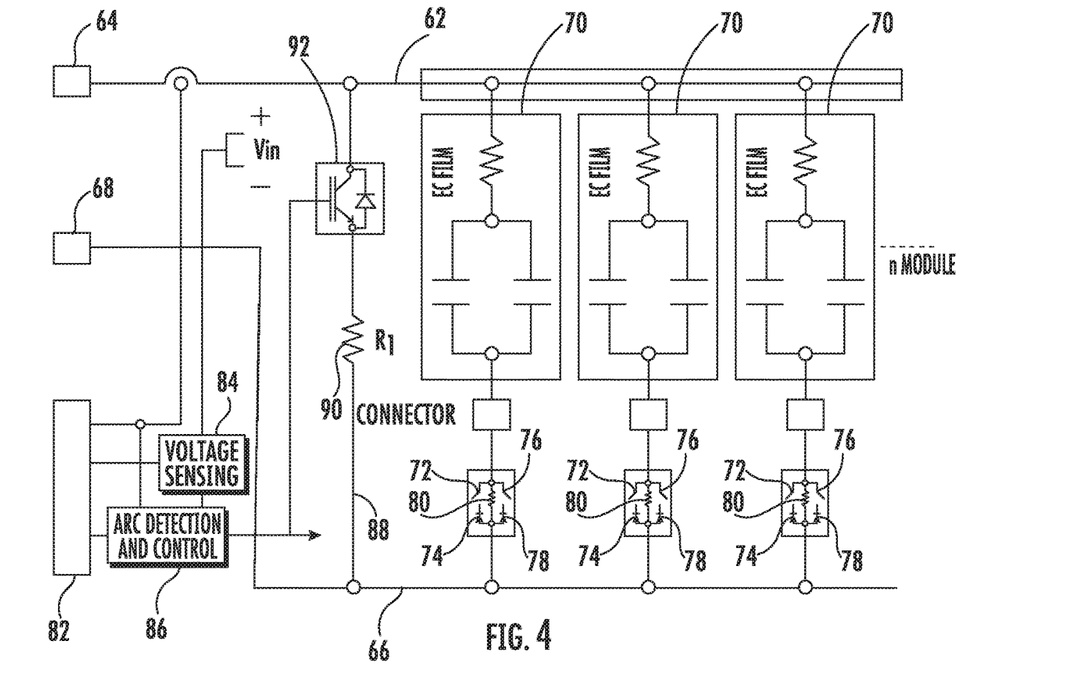
FIG. 4 schematically shows an electrical diagram including an electrocaloric element, a shunt load in series with the electrocaloric element, and a shunt load in parallel with the electrocaloric element.

In some embodiments, shunt loads can be disposed in both series and parallel with the electrocaloric elements 70, with respect to the power supply connections 64/68. An example embodiment of such a configuration is schematically shown in FIG. 4, with the same reference numbers used to describe like items without repetitive explanation below, with an additional parallel shunt load (resistor 90) in a shunt line 88 in parallel with the electrocaloric elements/modules 70, with respect to the power supply connections 64/68. The circuit of FIG. 4 operates similar to that of FIG. 3 during normal operation, with the switches 72 and 76 opening and closing out of sync to provide bi-directional current flow for charging and discharging the electrocaloric elements/modules 70. In the event of arcing, the power supply is turned off and a switch 92 in shunt line 88 is closed, leaving a parallel shunt path 88 for current discharge through the resistor 90. Switch 92 can be any type of switch configuration, as described above for switches 72 and 76. The circuit of FIG. 4 operates similar to that of FIG. 3 during normal operation, with the switches 72 and 76 opening and closing out of sync to provide bi-directional current flow for charging and discharging the electrocaloric elements/modules 70.

Figure 5:
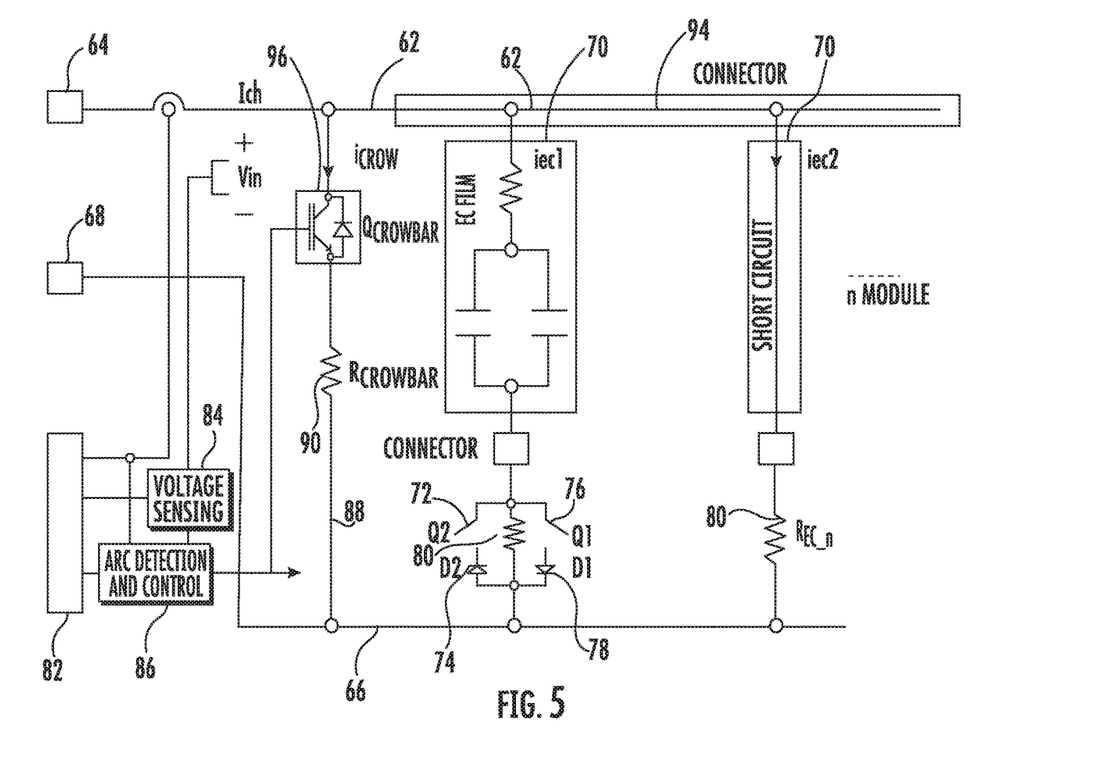
FIG. 5 schematically shows an electrical diagram for a system in an operational state in response to detection of an electrical arc.

It should be noted that although FIGS. 3 and 4 show systems with three electrocaloric elements/modules 70, the arc suppression circuit can be adapted for any number of electrocaloric elements/modules (e.g., "n" modules) as shown in FIG. 5. FIG. 5 also shows an operational state during an arc event for a circuit with both series and parallel shunt loads is schematically shown in FIG. 5. As shown in FIG. 5, switches 72 and 76 are opened and the switch 92 is closed, and the power supply turned off (or isolated), in response to an instruction from arc detection and control 86. The pathways for discharge and dissipation of current in response to the arcing event are shown by red or bold-faced arrows 94 and 96 through both shunt loads (resistors 80 and 90).

Of course, the above-described embodiments are only representative examples, and variations and modifications can be made by the skilled person. For example, simple resistors have been disclosed for the shunt loads, but any type of resistive load can be utilized, including but not limited to dummy load circuits, PTC device, inductive loads.

Figure 6:
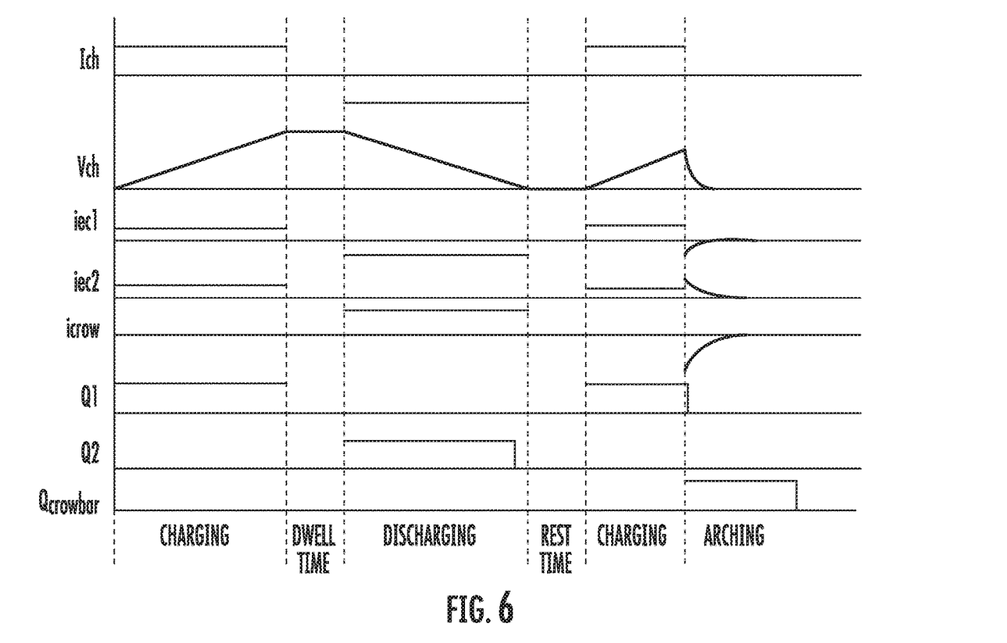
FIG. 6 shows a plot of voltage and current parameters, and switch settings, for a heat transfer system with two electrocaloric films or modules.

The operation of a system such as shown in FIGS. 4 and 5 is further shown in FIG. 6, which shows a plot of voltage and current parameters, and switch settings, for a heat transfer system with two electrocaloric elements/modules 70. Charging/discharging voltage from the power source ($V_{ch}$), charging/discharging current from the power source ($I_{ch}$), current through each or the electrocaloric elements (iec1 and iec2), and position of the switches 72, 76, and 96 are plotted over time for each of the electrical operating cycles of the system: charging, dwell time, discharging, rest time, charging again, and an arc event. As shown in FIG. 6, the system provides voltage and current parameters as needed for normal operation, and effectively dissipates current in response to an arcing event.

Although any directions described herein (e.g., "up", "down", "top", "bottom", "left", "right", "over", "under", etc.) are considered to be arbitrary and to not have any absolute meaning but only a meaning relative to other directions. For convenience, unless otherwise indicated, the terms shall be relative to the view of the Figure shown on the page, i.e., "up" or "top" refers to the top of the page, "bottom" or "under" refers to the bottom of the page, "right" to the right-hand side of the page, and "left" to the left-hand side of the page.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat transfer system, comprising:
   an electrocaloric element comprising an electrocaloric material, and electrodes arranged to impart an electric field to the electrocaloric material;
   a first thermal flow path between the electrocaloric material and a heat sink;
   a second thermal flow path between the electrocaloric material and a heat source; and
   an electric power source on operative electrical communication with the electrodes; and
   an arc suppression circuit in series with the electrocaloric element, comprising:
      an interruptible electrical connection configured to interrupt the electrical connection in response to detection of an arc between the electrodes; and
      a series shunt connection in parallel with the interruptible electrical connection, said series shunt connection including a series shunt load;
      wherein the interruptible electrical connection comprises: a first interruptible mono-directional connection configured to conduct current in a first direction with respect to the electrocaloric element, and a second interruptible mono-directional connection configured to conduct current in a second direction opposite to the first direction with respect to the electrocaloric element.

2. The heat transfer system of claim 1, wherein the first and second interruptible electrical connections are configured to open and close out of sync to provide an alternating direction of current flow in response to normal operation to alternately activate and deactivate the electrocaloric material in response to normal operation, and to both open simultaneously in response to detection of an arc between the electrodes.

3. The heat transfer system of claim 1, wherein the arc suppression circuit is disposed between the electrocaloric element and a connection to a positive voltage of the power source.

4. The heat transfer system of claim 1, wherein the arc suppression circuit is disposed between the electrocaloric element and a connection to a negative voltage of the power source.

5. The heat transfer system of claim 1, wherein the arc suppression circuit is disposed between the electrocaloric element and a connection to connection to a neutral voltage.

6. The heat transfer system of claim 1, further comprising a controller configured to selectively apply voltage to activate the electrodes in coordination with heat transfer along the first and second thermal flow paths to transfer heat from the heat source to the heat sink.

7. The heat transfer system of claim 1, further comprising a controller configured to detect an arc between the electrodes and to direct electrical current from the arcing electrodes through the series shunt load or to a parallel shunt load or to both the series shunt load and the parallel shunt load.

8. A heat transfer system, comprising:
   an electrocaloric element comprising an electrocaloric material, and electrodes arranged to impart an electric field to the electrocaloric material;
   a first thermal flow path between the electrocaloric material and a heat sink;
   a second thermal flow path between the electrocaloric material and a heat source; and
   an electric power source on operative electrical communication with the electrodes; and
   an arc suppression circuit in series with the electrocaloric element, comprising:
      an interruptible electrical connection configured to interrupt the electrical connection in response to detection of an arc between the electrodes; and
      a series shunt connection in parallel with the interruptible electrical connection, said series shunt connection including a series shunt load;
   further comprising a parallel shunt connection including a parallel shunt load, in operative electrical communication with the power source in parallel with the electrocaloric element.

9. The heat transfer system of claim 8, wherein the parallel shunt load has a lower resistance than the series shunt load.

10. A heat transfer system, comprising:
   an electrocaloric element comprising an electrocaloric material, and electrodes arranged to impart an electric field to the electrocaloric material;
   a first thermal flow path between the electrocaloric material and a heat sink;
   a second thermal flow path between the electrocaloric material and a heat source;
   an electric power source on operative electrical communication with the electrodes; and
   a parallel shunt connection including a parallel shunt load, said parallel shunt connection in operative electrical communication with the power source in parallel with the electrocaloric element;
   wherein the parallel shunt connection is configured to preclude current flow through the parallel shunt connection in response to normal operation and to allow current flow through the parallel shunt connection in response to detection of an arc between the electrodes.

11. The heat transfer system of claim 10, further comprising a controller configured to selectively apply voltage to activate the electrodes in coordination with heat transfer along the first and second thermal flow paths to transfer heat from the heat source to the heat sink.

12. The heat transfer system of claim 10, further comprising a controller configured to detect an arc between the electrodes and to direct electrical current from the arcing electrodes through a series shunt load or to the parallel shunt load or to both the series shunt load and the parallel shunt load.

13. A heat transfer system, comprising:
an electrocaloric element comprising an electrocaloric material, and electrodes arranged to impart an electric field to the electrocaloric material;
a first thermal flow path between the electrocaloric material and a heat sink;
a second thermal flow path between the electrocaloric material and a heat source;
an electric power source on operative electrical communication with the electrodes; and
a parallel shunt connection including a parallel shunt load, said parallel shunt connection in operative electrical communication with the power source in parallel with the electrocaloric element;
wherein a second shunt connection includes a power crowbar switch in series with a second shunt load, configured to preclude current flow through the power crowbar switch in response to normal operation and to allow current flow through the power crowbar switch in response to detection of an arc between the electrodes.

14. The heat transfer system of claim 13, wherein the power crowbar switch comprises a diode arranged to protect current flow in a direction from a negative voltage of the power source to a positive voltage of the power source or to a neutral voltage, and a bypass connection in parallel with the diode configured to activate in response to detection of an arc between the electrodes.

15. A method of transferring heat, comprising
selectively applying voltage from a power source to activate electrodes and apply an electric field to an electrocaloric material;
in coordination with application of voltage to the electrodes, transferring heat from a heat source to the electrocaloric material and from the electrocaloric material to a heat sink;
monitoring for occurrence of arcing between the electrodes; an
in response to detection of arcing between the electrodes, directing electrical current from the arcing electrodes to a shunt load in series or in parallel with the arcing electrodes with respect to the power source;
wherein electrical current is directed from the arcing electrodes to a shunt load in series with the arcing electrodes in response to detection of arcing.

16. The method of claim 15, A method of transferring heat, comprising
selectively applying voltage from a power source to activate electrodes and apply an electric field to an electrocaloric material;
in coordination with application of voltage to the electrodes, transferring heat from a heat source to the electrocaloric material and from the electrocaloric material to a heat sink;
monitoring for occurrence of arcing between the electrodes; an
in response to detection of arcing between the electrodes, directing electrical current from the arcing electrodes to a shunt load in series or in parallel with the arcing electrodes with respect to the power source;
wherein electrical current is directed from the arcing electrodes to a shunt load in parallel with the arcing electrodes in response to detection of arcing.

17. A method of transferring heat, comprising
selectively applying voltage from a power source to activate electrodes and apply an electric field to an electrocaloric material;
in coordination with application of voltage to the electrodes, transferring heat from a heat source to the electrocaloric material and from the electrocaloric material to a heat sink;
monitoring for occurrence of arcing between the electrodes; an
in response to detection of arcing between the electrodes, directing electrical current from the arcing electrodes to a shunt load in series or in parallel with the arcing electrodes with respect to the power source;
wherein electrical current is directed from the arcing electrodes to a shunt load in series with the arcing electrodes and to a shunt load in parallel with the arcing electrodes in response to detection of arcing.

\* \* \* \* \*